US008448444B2

(12) United States Patent
Cihlar et al.

(10) Patent No.: US 8,448,444 B2
(45) Date of Patent: May 28, 2013

(54) METHOD AND APPARATUS FOR MOUNTING TRANSITION PIECE IN COMBUSTOR

(75) Inventors: David William Cihlar, Greenville, SC (US); Patrick Benedict Melton, Horse Shoe, NC (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 13/030,340

(22) Filed: Feb. 18, 2011

(65) Prior Publication Data

US 2012/0210729 A1 Aug. 23, 2012

(51) Int. Cl.
*F02C 1/00* (2006.01)

(52) U.S. Cl.
USPC .............................................. 60/772; 60/799

(58) Field of Classification Search
USPC ......................... 60/39.37, 752, 772, 796–800
See application file for complete search history.

(56) References Cited

U.S. PATENT DOCUMENTS

| | | | | | |
|---|---|---|---|---|---|
| 2,511,432 | A | * | 6/1950 | Feilden | 60/796 |
| 2,592,060 | A | | 4/1952 | Oulianoff | |
| 2,720,080 | A | * | 10/1955 | Oulianoff | 60/804 |
| 3,327,473 | A | * | 6/1967 | Smith | 60/39.37 |
| 3,750,398 | A | * | 8/1973 | Adelizzi et al. | 60/39.37 |
| 3,759,038 | A | * | 9/1973 | Scalzo et al. | 60/800 |
| 4,297,843 | A | | 11/1981 | Sato et al. | |
| 4,413,470 | A | | 11/1983 | Scheihing et al. | |
| 4,567,730 | A | | 2/1986 | Scott | |
| 4,719,748 | A | * | 1/1988 | Davis et al. | 60/39.37 |
| 4,903,477 | A | * | 2/1990 | Butt | 60/39.37 |
| 5,351,474 | A | * | 10/1994 | Slocum et al. | 60/39.23 |
| 5,361,577 | A | | 11/1994 | Cromer | |
| 5,400,586 | A | | 3/1995 | Bagepalli et al. | |
| 5,419,114 | A | | 5/1995 | Bauermeister et al. | |
| 6,412,268 | B1 | | 7/2002 | Cromer et al. | |
| 6,484,505 | B1 | | 11/2002 | Brown et al. | |
| 6,615,588 | B2 | | 9/2003 | Hoecker | |
| 7,681,403 | B2 | | 3/2010 | Johnson et al. | |
| 8,397,512 | B2 | * | 3/2013 | Hessler et al. | 60/759 |
| 2006/0032237 | A1 | | 2/2006 | Aumont et al. | |
| 2006/0242965 | A1 | | 11/2006 | Shi et al. | |
| 2007/0130958 | A1 | | 6/2007 | Ohri et al. | |
| 2007/0240423 | A1 | | 10/2007 | Bulman et al. | |
| 2009/0101788 | A1 | * | 4/2009 | Kidder et al. | 248/674 |
| 2009/0321608 | A1 | * | 12/2009 | Melton et al. | 248/674 |
| 2011/0179803 | A1 | * | 7/2011 | Berry et al. | 60/785 |

* cited by examiner

*Primary Examiner* — Phutthiwat Wongwian
(74) *Attorney, Agent, or Firm* — Dority & Manning PA

(57) ABSTRACT

A bracket for a combustor, and a method for mounting a transition piece in a combustor, are disclosed. The combustor has an impingement sleeve at least partially surrounding a transition piece and an outer casing at least partially surrounding the impingement sleeve. The bracket is mounted to the transition piece and connected to the outer casing. The method includes mounting a bracket to the transition piece, extending the bracket through an impingement sleeve, the impingement sleeve at least partially surrounding the transition piece, and connecting the bracket to an outer casing, the outer casing at least partially surrounding the impingement sleeve.

20 Claims, 3 Drawing Sheets

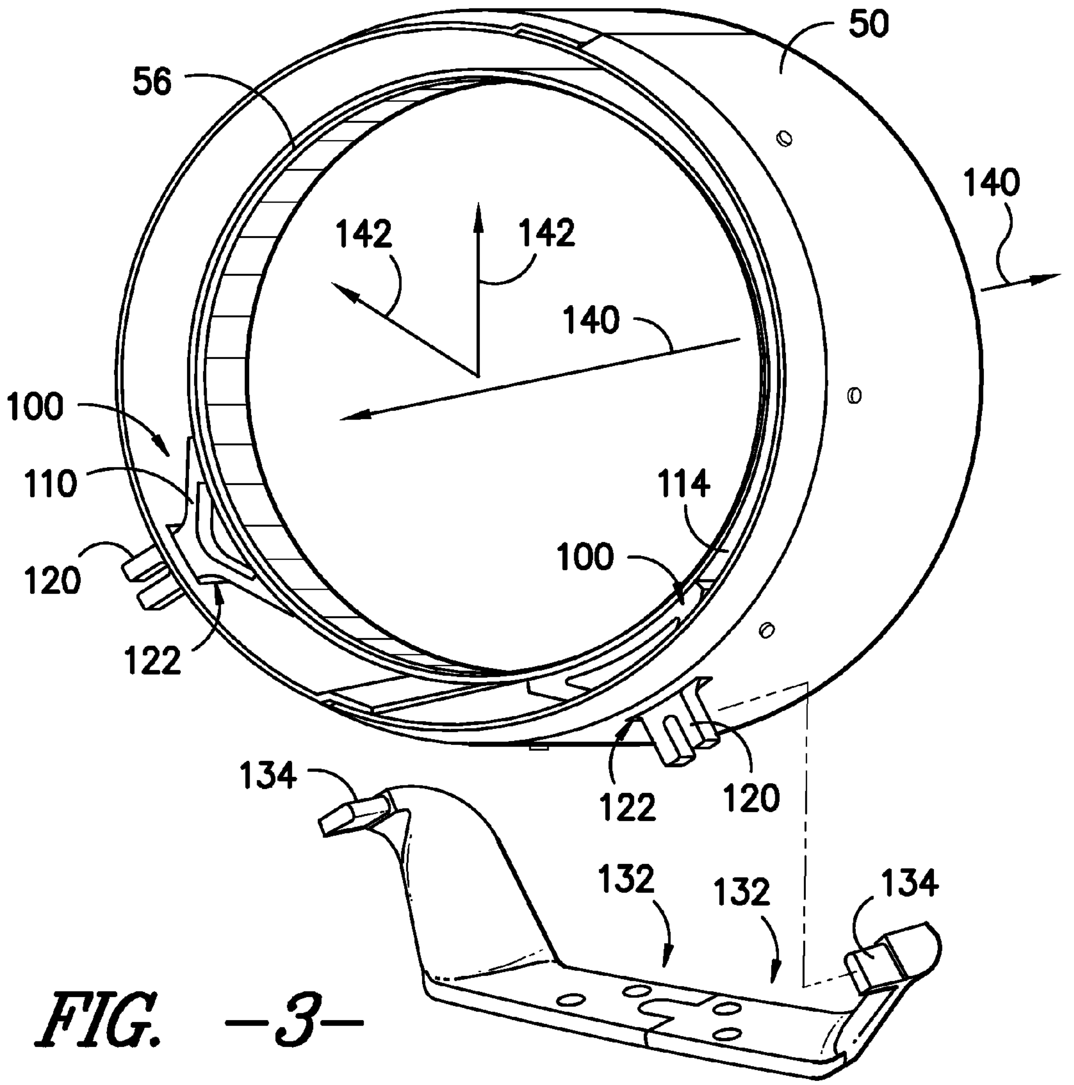
FIG. –3–
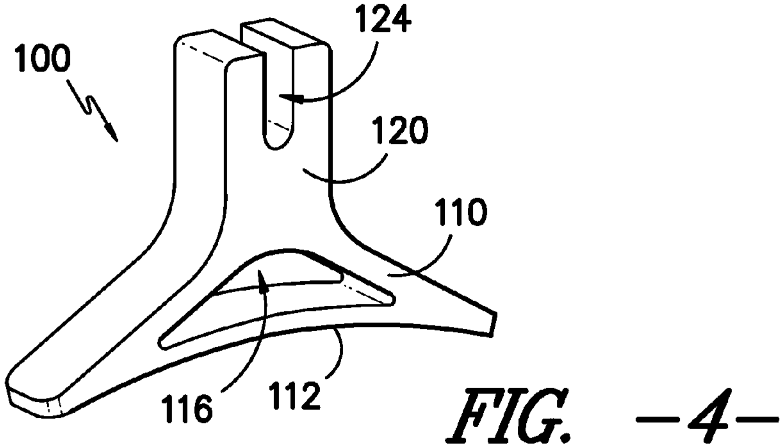
FIG. –4–

METHOD AND APPARATUS FOR MOUNTING TRANSITION PIECE IN COMBUSTOR

FIELD OF THE INVENTION

The subject matter disclosed herein relates generally to turbine systems, and more particularly to methods and apparatus for mounting transition pieces in combustors of turbine systems.

BACKGROUND OF THE INVENTION

Turbine systems are widely utilized in fields such as power generation. For example, a conventional gas turbine system includes a compressor, a combustor, and a turbine. During operation of a turbine system, many components of the system may be subjected to significant structural vibrations and thermal expansion. These effects can stress the components and eventually cause the components to fail. For example, in gas turbine systems, the combustor impingement sleeves, which surround the combustor transition pieces, are particularly vulnerable to structural vibrations. Further, both the impingement sleeves and transition pieces are vulnerable to thermal expansion.

A typical arrangement of an impingement sleeve and transition piece includes an outer ring disposed at the forward end of the impingement sleeve. A plurality of spacers may be welded between the transition piece and the support ring. Mounting brackets are mounted to the support ring and connected to the compressor discharge casing to mount the transition piece in the combustor. This arrangement, however, may be expensive and susceptible to cracking. For example, the outer ring may not adequately accommodate the structural vibration and thermal expansion of both the transition piece and the impingement sleeve. Further, loading between the compressor discharge casing and the transition piece may not be optimally transmitted, because the loads must be transmitted through the outer ring.

Thus, an improved apparatus and method for mounting a transition piece in a combustor would be desired in the art. For example, an apparatus and method that provide for direct mounting of the transition piece to the compressor discharge casing would be advantageous. Additionally, an apparatus and method that provide for mounting of a transition piece and that are less expensive and less susceptible to cracking would be desired.

BRIEF DESCRIPTION OF THE INVENTION

Aspects and advantages of the invention will be set forth in part in the following description, or may be obvious from the description, or may be learned through practice of the invention.

In one embodiment, a bracket for a combustor is disclosed. The combustor has an impingement sleeve at least partially surrounding a transition piece and an outer casing at least partially surrounding the impingement sleeve. The bracket includes a base configured to be mounted to the transition piece and a flange extending from the base and configured to be connected to the outer casing.

In another embodiment, a combustor is disclosed. The combustor includes a transition piece, an impingement sleeve at least partially surrounding the transition piece, an outer casing at least partially surrounding the impingement sleeve and the transition piece, and a bracket mounted to the transition piece and connected to the outer casing.

In another embodiment, a method for mounting a transition piece in a combustor is disclosed. The method includes mounting a bracket to the transition piece. The method further includes extending the bracket through an impingement sleeve, the impingement sleeve at least partially surrounding the transition piece. The method further includes connecting the bracket to an outer casing, the outer casing at least partially surrounding the impingement sleeve.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a perspective view of a plurality of brackets, exploded from a plurality of mating brackets, according to one embodiment of the present disclosure; and, FIG. 4 is a perspective view of a bracket according to one embodiment of the present disclosure.

DETAILED DESCRIPTION OF THE INVENTION

Figure 1:
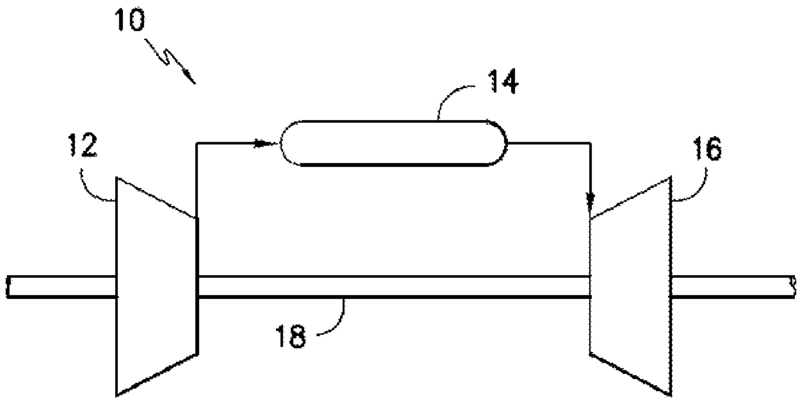
FIG. 1 is a schematic illustration of a gas turbine system.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. The system 10 may include a compressor 12, a combustor 14, and a turbine 16. Further, the system 10 may include a plurality of compressors 12, combustors 14, and turbines 16. The compressors 12 and turbines 16 may be coupled by a shaft 18. The shaft 18 may be a single shaft or a plurality of shaft segments coupled together to form shaft 18.

Figure 2:
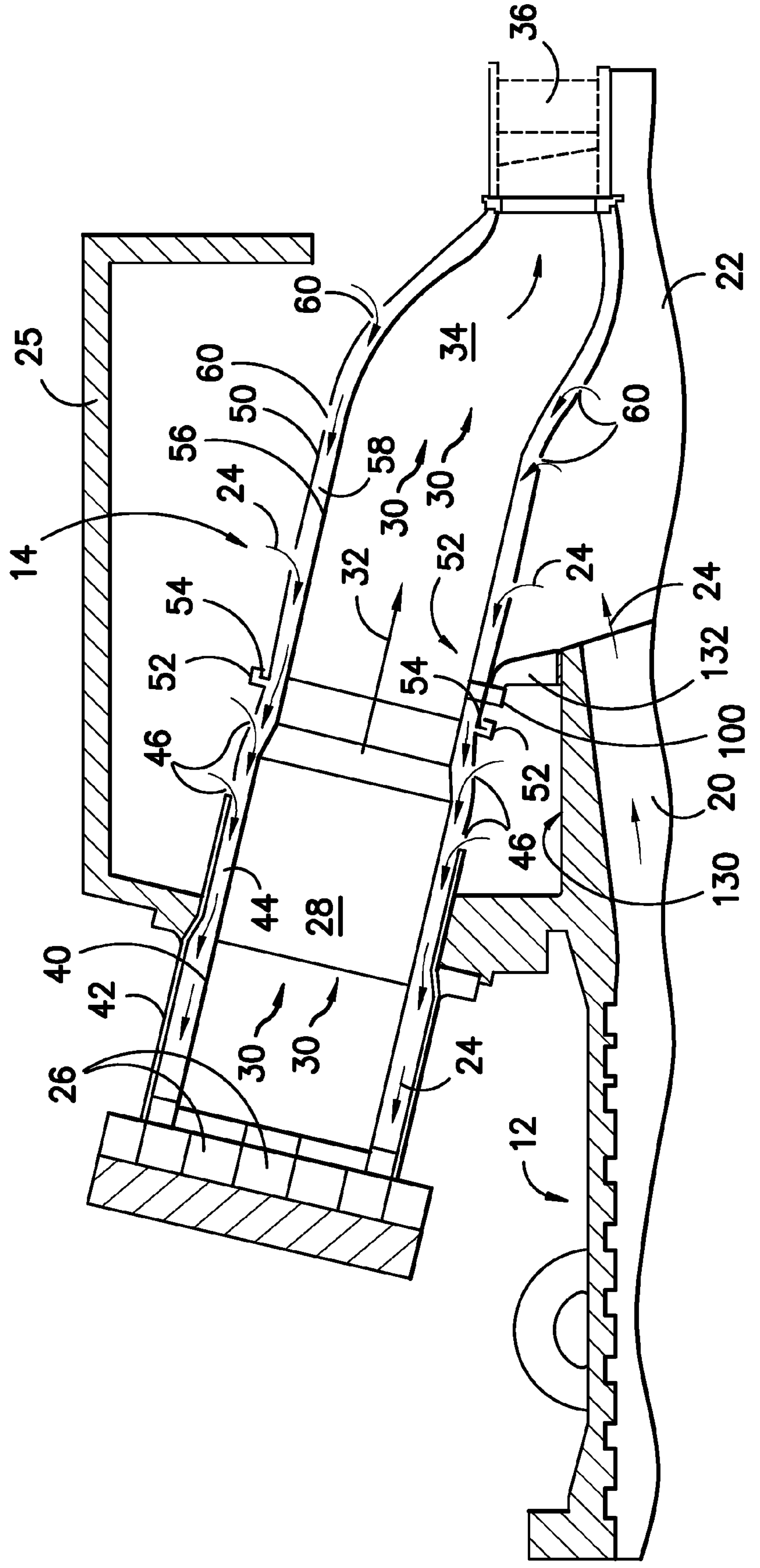
FIG. 2 is a side cutaway view of various components of a gas turbine system according to one embodiment of the present disclosure.

As illustrated in FIG. 2, the combustor 14 is generally fluidly coupled to the compressor 12 and the turbine 16. The compressor 12 may include a diffuser 20 and a discharge plenum 22 that are coupled to each other in fluid communication, so as to facilitate the channeling of a working fluid 24 to the combustor 14. As shown, at least a portion of the discharge plenum 22 is defined by an outer casing 25, such as a compressor discharge casing. After being compressed in the compressor 12, working fluid 24 may flow through the diffuser 20 and be provided to the discharge plenum 22. The working fluid 24 may then flow from the discharge plenum 22 to the combustor 14, wherein the working fluid 24 is combined with fuel from fuel nozzles 26. After mixing with the fuel, the working fluid 24/fuel mixture may be ignited within combustion chamber 28 to create hot gas flow 30. The hot gas flow 30 may be channeled through the combustion chamber 28 along a hot gas path 32 into a transition piece cavity 34 and through a turbine nozzle 36 to the turbine 16.

The combustor 14 may comprise a hollow annular wall configured to facilitate working fluid 24. For example, the combustor 14 may include a combustor liner 40 disposed within a flow sleeve 42. The arrangement of the combustor liner 40 and the flow sleeve 42, as shown in FIG. 2, is generally concentric and may define an annular passage or flow path 44 therebetween. In certain embodiments, the flow sleeve 42 and the combustor liner 40 may define a first or upstream hollow annular wall of the combustor 14. The flow sleeve 42 may include a plurality of inlets 46, which provide a flow path for at least a portion of the working fluid 24 from the compressor 12 through the discharge plenum 22 into the flow path 44. In other words, the flow sleeve 42 may be perforated with a pattern of openings to define a perforated annular wall. The interior of the combustor liner 40 may define the substantially cylindrical or annular combustion chamber 28 and at least partially define the hot gas path 32 through which hot gas flow 30 may be directed.

Downstream from the combustor liner 40 and the flow sleeve 42, an impingement sleeve 50 may be coupled to the flow sleeve 42. The flow sleeve 42 may include a mounting flange 52 configured to receive a mounting member 54 of the impingement sleeve 50. A transition piece 56 may be disposed within the impingement sleeve 50, such that the impingement sleeve 50 surrounds at least a portion of the transition piece 56. A concentric arrangement of the impingement sleeve 50 and the transition piece 56 may define an annular passage or flow path 58 therebetween. The impingement sleeve 50 may include a plurality of inlets 60, which may provide a flow path for at least a portion of the working fluid 24 from the compressor 12 through the discharge plenum 22 into the flow path 58. In other words, the impingement sleeve 50 may be perforated with a pattern of openings to define a perforated annular wall. Interior cavity 34 of the transition piece 56 may further define hot gas path 32 through which hot gas flow 30 from the combustion chamber 28 may be directed into the turbine 16.

As shown, the flow path 58 is fluidly coupled to the flow path 44. Thus, together, the flow paths 44 and 58 define a flow path configured to provide working fluid 24 from the compressor 12 and the discharge plenum 22 to the fuel nozzles 26, while also cooling the combustor 14.

As discussed above, the turbine system 10, in operation, may intake working fluid 24 and provide the working fluid 24 to the compressor 12. The compressor 12, which is driven by the shaft 18, may rotate and compress the working fluid 24. The compressed working fluid 24 may then be discharged into the diffuser 20. The majority of the compressed working fluid 24 may then be discharged from the compressor 12, by way of the diffuser 20, through the discharge plenum 22 and into the combustor 14. Additionally, a small portion (not shown) of the compressed working fluid 24 may be channeled downstream for cooling of other components of the turbine engine 10.

As shown, the outer casing 25 defining the discharge plenum 22 may at least partially surround the impingement sleeve 50 and the flow sleeve 42. A portion of the compressed working fluid 24 within the discharge plenum 22 may enter the flow path 58 by way of the inlets 60. The working fluid 24 in the flow path 58 may then be channeled upstream through flow path 44, such that the working fluid 24 is directed over the combustor liner 34. Thus, a flow path is defined in the upstream direction by flow path 58 (formed by impingement sleeve 50 and transition piece 56) and flow path 44 (formed by flow sleeve 42 and combustor liner 40). Accordingly, flow path 44 may receive working fluid 24 from both flow path 58 and inlets 46. The working fluid 24 flowing through the flow path 44 may then be channeled upstream towards the fuel nozzles 26, as discussed above.

The transition piece 56 and the impingement sleeve 50 of the combustor 14 generally must be mounted and positioned in the combustor 14. In general, it would be desirable for such mounting apparatus and methods to be relatively inexpensive and to prevent cracking of the various components of the combustor 14.

Thus, the present disclosure is further directed to a bracket 100, or a plurality of brackets 100, for mounting the transition piece 56 in the combustor 14. The bracket 100 according to the present disclosure provides a connection between the transition piece 56 and the outer casing 25. Thus, in exemplary embodiments, the bracket 100 may advantageously eliminate the need for previously utilized components in the combustor 14, such as outer rings and spacers, which may prove costly to the combustor 14 and can lead to cracking of various components of the combustor 14. The bracket 100 according to the present disclosure may further, in some embodiments, allow a forward end of the impingement sleeve 50 to be extended and elongated in the generally upstream direction towards the flow sleeve 42 and potentially directly connected to the flow sleeve 42, rather than connected through an outer ring. As is generally known in the art, the forward end of the impingement sleeve 50 is the end of the impingement sleeve 50 generally adjacent to the flow sleeve 42. This elimination of various components and potential modification of the impingement sleeve 50 thus provide many advantages over prior art combustors 14 that utilize transition pieces 56 at least partially surrounded by impingement sleeves 50. It should be understood, however, that the various components discussed above need not be eliminated, and that impingement sleeves 50 and combustors 14 including the various components, such as impingement sleeves 50 comprising outer rings at the forward ends, are within the scope and spirit of the present disclosure.

As shown in FIGS. 2 through 4, a bracket 100 or a plurality of brackets 100 may be mounted to the transition piece 56 and connected to the outer casing 25. In exemplary embodiments, at least a portion of the brackets 100 may be positioned adjacent to the forward end of the transition piece 56. As is generally known in the art, the forward end of the transition piece 56 is the end of the transition piece 56 generally adjacent to the combustor liner 40. However, it should be understood that the brackets 100 according to the present disclosure may generally be positioned at any location along or about the periphery of the transition piece 56.

For example, in exemplary embodiments, a plurality of brackets 100 may be arranged in a generally annular array about the transition piece 56 or a portion thereof, as shown in FIG. 3. For example, as shown, two brackets 100 may be spaced apart from each other in a generally annular array about at least a portion of the periphery of the transition piece. Alternatively, three or more brackets 100 may be may be spaced apart from each other in a generally annular array about at least a portion of the periphery of the transition piece. Additionally or alternatively, a plurality of brackets 100 may be arranged in a plurality of arrays, and the arrays may be arranged along the length or a portion thereof of the transition piece 56.

It should be understood that the present disclosure is not limited to a certain number or arrangement of brackets 100.

Rather, any suitable number and arrangement of brackets 100 provided on the transition piece 56 is within the scope and spirit of the present disclosure.

As mentioned above, the bracket 100 according to the present disclosure may be mounted to the transition piece 56. Thus, in exemplary embodiments, the bracket 100 may comprise a base 110. The base 110 may be configured for mounting to the transition piece 56, and may thus be mounted to the transition piece 56 in the combustor 14. As shown in FIGS. 3 and 4, the base 110 may define a mount surface 112. The mount surface 112 may generally be that surface of the base 110 that contacts the transition piece 56 when the bracket 100 is mounted to the transition piece 56. Thus, in some embodiments, the mount surface 112 may have a contour that is generally similar to the contour of outer surface 114 of the transition piece 56 at the location wherein the mount surface 112 contacts the outer surface 114. Alternatively, however, the mount surface 112 may have any contour suitable for mounting the bracket 100 to the transition piece 56.

The bracket 100, such as the base 110, may be mounted to the transition piece 56 through any suitable mounting device or process. In some embodiments, for example, a suitable mechanical fastener and/or a suitable weld may be utilized to mount the bracket 100. Suitable mechanical fasteners may include, for example, nut-bolt combinations, rivets, screws, nails, or any other suitable mechanical fastening devices. Suitable welds may be applied utilizing any suitable welding technique. Alternatively, mounting of a bracket 100 may include, for example, forming a bracket 100 integral with the transition piece 56. Thus, an integral transition piece 56 and bracket 100 may constitute a bracket 100 mounted to a transition piece 56 according to the present disclosure.

As shown in FIGS. 3 and 4, in some embodiments, the base 110 may generally taper throughout the height of the base 100, or a portion thereof. For example, the base 110 may taper from a generally wider portion adjacent the transition piece 56 to a generally narrower portion spaced from the transition piece 56. This may advantageously allow loads applied to the base 110 to be better distributed to the transition piece 56. However, it should be understood that the present disclosure is not limited to brackets 100 with tapered bases 110, and rather that any suitably shaped base 110 is within the scope and spirit of the present disclosure.

As shown in FIGS. 3 and 4, in some embodiments, the base 110 may define a flow passage 116 or a plurality of flow passages 116 therethrough. A flow passage 116 defined in the base 110 may, for example, allow working medium 24 flowing between the transition piece 56 and impingement sleeve 50 to flow therethrough, thus allowing the working medium 24 to flow more efficiently upstream. The flow passage 116 or flow passages 116 may, in some embodiments, taper similar to the taper of the base 110, as discussed above. However, it should be understood that the present disclosure is not limited to bases 110 with tapered flow passages 116, and rather than any suitably shaped flow passage 116 of any suitable size is within the scope and spirit of the present disclosure.

As mentioned above, the bracket 100 according to the present disclosure may be connected to the outer casing 25. Thus, in exemplary embodiments, the bracket 100 may comprise a flange 120. The flange 120 may, for example, extend from the base 110 and be configured for connecting the transition piece 56 to the outer casing 25, and may thus connect the transition piece 56 to the outer casing 25 in the combustor 14.

As shown in FIGS. 3 and 4, the flange 120 in exemplary embodiments may extend through the impingement sleeve 50. The impingement sleeve 50 may, for example, define a bracket passage 122 or a plurality of bracket passages 122. The bracket passages 122 may be positioned such that each bracket 100 is associated with a bracket passage 122, and a portion of the bracket 100, such as the flange 120 or a portion thereof, extends through the bracket passage 122. Thus, the bracket passages 122 may in exemplary embodiments allow for the direct connection of the bracket 100 to the outer casing 25 or a component thereof, as discussed below, and thus provide a direction connection between the transition piece 56 and the outer casing 25.

The bracket passage 122 according to the present disclosure may have any suitable size and shape. In some embodiments, a bracket passage 122 may be sized and shaped to generally prevent contact between the impingement sleeve 50 and the bracket 100. Thus, during operation of the system 10, contact between the impingement sleeve 50 and the bracket 100 may desirably be relatively infrequent. In other embodiments, however, the bracket passage 122 may allow for intermittent or constant contact, as desired or required.

The flange 120 according to the present disclosure may have any suitable size and shape for connecting the bracket 100 and the outer casing 25. For example, in some embodiments as shown in FIGS. 3 and 4, the flange 120 may define a slot 124. The slot 124 may be configured for connecting the bracket 100 to the outer casing 25, and may thus connect the bracket 100 to the outer casing 25.

For example, the outer casing 25 may define an inner surface 130, as shown in FIG. 2. In some embodiments, the flange 120 may, for example, connect to the inner surface 130. In other embodiments, various components may extend from outer casing 25, such as from the inner surface 130, to mount the bracket 100 to the outer casing 25. As shown in FIGS. 2 and 3, for example, the outer casing 25 may include a mating bracket 132 or a plurality of mating brackets 132. The mating brackets 132 may extend from the inner surface 130 of the outer casing 25, and be configured for connecting the bracket 100 or brackets 100 and the outer casing 25. Thus, a mating bracket 132 may, in exemplary embodiments, be provided and associated with each of the brackets 100.

The mating bracket 132 may be mounted to the outer casing 25 through any suitable mounting device or process. In some embodiments, for example, a suitable mechanical fastener and/or a suitable weld may be utilized to mount the mating bracket 132. Suitable mechanical fasteners may include, for example, nut-bolt combinations, rivets, screws, nails, or any other suitable mechanical fastening devices. Suitable welds may be applied utilizing any suitable welding technique. Alternatively, mounting of a mating bracket 132 may include, for example, forming a mating bracket 132 integral with the outer casing 25. Thus, an integral outer casing 25 and mating bracket 132 may constitute a mating bracket 132 mounted to an outer casing 25 according to the present disclosure.

In exemplary embodiments, a mating bracket 132 according to the present disclosure may include a tab portion 134, as shown in FIG. 3. The tab portion 134 may be configured to connect with the bracket 100, thus connecting the bracket 100 and the outer casing 25. In exemplary embodiments as shown in FIG. 3, the tab portion 134 may be configured to connect with the slot 124. For example, the tab portion 134 may be inserted into the slot 124, thus connecting the bracket 100 and the outer casing 25.

It should be understood that the slot 124 and the tab portion 134 need not be included on the flange 120 and the mating bracket 132 respectively. For example, in alternative embodiments, a slot may be included on the mating bracket 132 and a tab portion may be included on the flange 120, or mating slots may be included on the flange 120 and the mating bracket 132, or mating tab portions may be included on the flange 120 and the mating bracket 132. Further, any suitable configuration of the bracket 100 and the mating bracket 132, or the bracket 100 and any other component or the outer casing 25 itself, to connect the transition piece 56 and the outer casing 25 is within the scope and spirit of the present disclosure.

As discussed, the bracket 100 according to the present disclosure may connect the transition piece 56 and the outer casing 25. Further, the bracket 100 may in some embodiments prevent movement of the transition piece 56 relative to the outer casing 25 in one or more directions, and/or may allow movement of the transition piece 56 relative to the outer casing 25 in one or more directions. For example, in exemplary embodiments, the connection between the bracket 100 and the outer casing 25, such as between the bracket 100 and the mating bracket 132, may generally prevent axial movement of the transition piece 56 in one or more directions. Axial movement may generally be defined as movement along axial axis 140, as shown in FIG. 3. Additionally or alternatively, in exemplary embodiments, the connection between the bracket 100 and the outer casing 25, such as between the bracket 100 and the mating bracket 132, may generally allow radial movement of the transition piece 56 in one or more directions. Radial movement may generally be defined as movement along radial axis 142, as shown in FIG. 3. The prevention of axial movement may thus position the transition piece 56 within the outer casing 25, while the allowing of radial movement may thus allow the transition piece 56 to vibrate and grow or contract due to thermal expansion during operation of the system 10. Beneficially, this may reduce or prevent the likelihood of cracking during operation of the system 10, thus prolonging the life of the transition piece 56 and the system 10 in general.

The present disclosure is further directed to a method for mounting a transition piece 56 in a combustor 14. When mounted in the combustor 14, the transition piece 56, as discussed above, may be at least partially surrounded by the impingement sleeve 50, which may be at least partially surrounded by the outer casing 25.

The method may include, for example, mounting a bracket 100 or a plurality of brackets 100 to the transition piece 56, as discussed above.

The method may further include extending the bracket 100 or brackets 100 through the impingement sleeve 50, such as through a bracket passage 122 or bracket passages 122 defined in the impingement sleeve 50, as discussed above. Thus, in exemplary embodiments wherein the impingement sleeve 50 defines bracket passages 122, each of the brackets 100 may be positioned within a bracket passage 122 such that a portion of the bracket 100, such as the flange 120, protrudes through the bracket passage 122. The bracket 100 may thus be available for connecting to the outer casing 25.

The method may further include mounting a mating bracket 132, or a plurality of mating brackets 132, to an inner surface 130 of the outer casing 25, as discussed above.

The method may further include connecting the bracket 100 to the outer casing 25, such as to a mating bracket 132 extending from the outer casing 132, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor comprising:

a transition piece;

an impingement sleeve at least partially surrounding the transition piece;

an outer casing at least partially surrounding the impingement sleeve and the transition piece;

a bracket mounted at a first end to an outer surface of the transition piece and connected to the outer casing, and wherein the impingement sleeve defines a bracket passage, and wherein a portion of the bracket extends through the bracket passage.

2. The combustor of claim 1, wherein the bracket comprises a base mounted to the transition piece and a flange extending from the base and connected to the outer casing.

3. The combustor of claim 2, wherein the base defines a flow passage therethrough.

4. The combustor of claim 2, wherein the base defines a mount surface, the mount surface having a contour generally similar to a contour of an outer surface of the transition piece.

5. The combustor of claim 2, wherein the flange defines a slot, the slot configured for connecting the bracket to the outer casing.

6. The combustor of claim 1, wherein the impingement sleeve defines a bracket passage, and wherein a portion of the bracket extends through the bracket passage.

7. The combustor of claim 1, wherein the outer casing defines an inner surface and comprises a mating bracket extending from the inner surface, the mating bracket connecting the bracket and the outer casing.

8. The combustor of claim 7, wherein the mating bracket comprises a tab portion configured to connect with the bracket.

9. The combustor of claim 1, further comprising a plurality of brackets.

10. The combustor of claim 1, wherein the connection between the bracket and the outer casing generally prevents axial movement of the transition piece in at least one direction and generally allows radial movement and thermal expansion of the transition piece.

11. A bracket for a combustor, the combustor having an impingement sleeve at least partially surrounding a transition piece and an outer casing at least partially surrounding the impingement sleeve, the bracket comprising:

a base configured to be mounted at a first end to an outer surface of the transition piece;

a flange extending from the base and configured to be connected to the outer casing, and wherein a portion of the flange is configured to extend through a bracket passage defined in the impingement sleeve.

12. The bracket of claim 11, wherein the base defines a flow passage therethrough.

13. The bracket of claim 11, wherein the base defines a mount surface, the mount surface having a contour generally similar to a contour of an outer surface of the transition piece.

14. The bracket of claim 11, wherein the flange defines a slot, the slot configured for connecting the flange to the outer casing.

15. The bracket of claim 11, wherein a portion of the flange is configured to extend through a bracket passage defined in the impingement sleeve.

16. The bracket of claim 11, wherein the flange is configured to connect with a mating bracket extending from an inner surface of the outer casing.

17. A method for mounting a transition piece in a combustor, the method comprising:

mounting a bracket at a first end to an outer surface of the transition piece;

extending the bracket through an impingement sleeve, the impingement sleeve at least partially surrounding the transition piece; and, connecting the bracket to an outer casing, the outer casing at least partially surrounding the impingement sleeve.

18. The method of claim 17, wherein the bracket comprises a base and a flange extending from the base.

19. The method of claim 17, further comprising mounting a mating bracket to an inner surface of the outer casing.

20. The method of claim 19, wherein the connecting step comprises connecting the bracket to the mating bracket.

* * * * *